United States Patent [19]
Blatter

[11] 3,767,161
[45] Oct. 23, 1973

[54] DIAPHRAGM VALVE LOGIC ELEMENT
[75] Inventor: Albert Blatter, Southfield, Mich.
[73] Assignee: The Bendix Corporation, Southfield, Mich.
[22] Filed: Aug. 16, 1971
[21] Appl. No.: 171,840

[52] U.S. Cl. .................... 251/61.1, 235/201 ME
[51] Int. Cl. .................... G06d 1/02, F16k 31/145
[58] Field of Search ......................... 251/61.1, 24; 235/201 ME; 137/625.66, 625.6, 625.48

[56] References Cited
UNITED STATES PATENTS
| | | | |
|---|---|---|---|
| 3,485,258 | 12/1969 | Greene | 251/61.1 X |
| 2,529,028 | 11/1950 | Landon | 251/61.1 X |
| 3,057,376 | 10/1962 | Agutter et al. | 251/61.1 X |
| 3,531,079 | 9/1970 | Greene | 251/61.1 |

Primary Examiner—Arnold Rosenthal
Attorney—John R. Benefiel et al.

[57] ABSTRACT

A fluidic moving part logic element is disclosed comprised of a diaphragm and housing defining a control pressure chamber on one side of the diaphragm and a supply pressure chamber on the other side with movement of the diaphragm in response to a pressure difference thereacross controlling communication of the supply pressure with an output passage. The supply fluid passes through a narrowed section defined in part by the diaphragm itself in reaching the output or a vent to create an average pressure on the supply pressure side of the diaphragm that is lower than the supply and the output passage pressure as a result of the Bernoulli effect to enable a control pressure of lower magnitude than the supply or output pressure to move the diaphragm against the supply pressure to control switching.

5 Claims, 10 Drawing Figures

Patented Oct. 23, 1973

INVENTOR
ALBERT BLATTER
BY John R Benefiel
ATTORNEY

Patented Oct. 23, 1973
3,767,161
2 Sheets-Sheet 2
FIG. 3
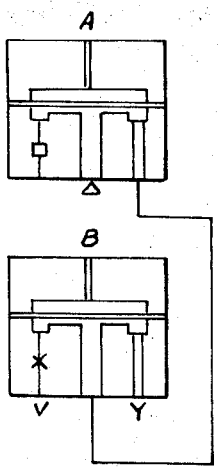
FIG. 3A
| A | B | Y |
|---|---|---|
| 0 | 0 | 1 |
| 1 | 0 | 0 |
| 0 | 1 | 0 |
| 1 | 1 | 0 |
FIG. 4
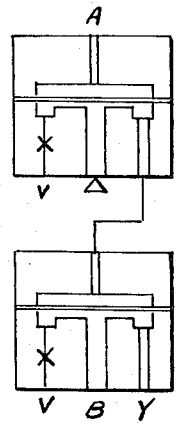
FIG. 4A
| A | B | Y |
|---|---|---|
| 0 | 0 | 0 |
| 1 | 0 | 0 |
| 0 | 1 | 0 |
| 1 | 1 | 1 |
FIG. 5
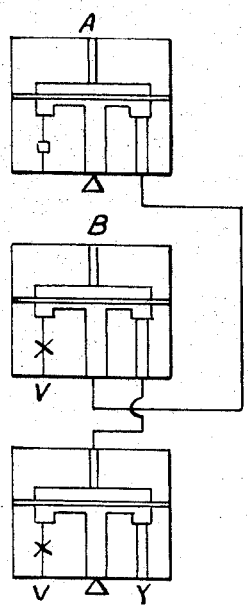
FIG. 5A
| A | B | Y |
|---|---|---|
| 0 | 0 | 0 |
| 1 | 0 | 1 |
| 0 | 1 | 1 |
| 1 | 1 | 1 |
FIG. 6
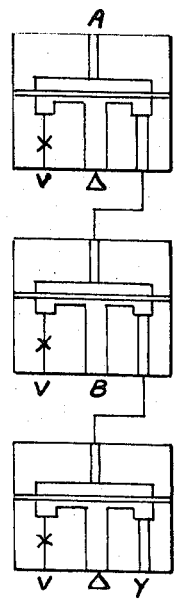
FIG. 6A
| A | B | Y |
|---|---|---|
| 0 | 0 | 1 |
| 1 | 0 | 1 |
| 0 | 1 | 1 |
| 1 | 1 | 0 |
INVENTOR
ALBERT BLATTER
BY *John R Benefiel*
ATTORNEY

DIAPHRAGM VALVE LOGIC ELEMENT

BACKGROUND OF THE INVENTION

1. Field of the Invention

This invention concerns logic elements and more particularly logic elements of the fluidic moving part type.

2. Description of the Prior Art

Pure fluidic devices which involve only fluid acting on fluid have as yet failed to gain widespread commercial acceptance despite certain distinct advantages, such as safety (no spark) and reliability over corresponding electronic and electromechanical devices. This situation has come about for several reasons, many of these being the requirement for extremely clean air supply and sensitivity of these devices to contamination, the low pressures at which the devices operate (necessitating output interface valves to operate control actuators), and as most of these devices require continuous venting to function, power consumption for a system utilizing a number of devices can be considerable.

Fluidic moving part logic elements on the other hand which involve moving mechanical components alleviate these disadvantages to a considerable degree while largely retaining the advantages thereof as they usually operate at higher pressures, i.e., 25–150 psi, eliminating in many instances the need for the interface valve; they are not as sensitive to dirty or oily air supplies; and they usually involve either no flow or very low flow in operation to thus minimize power consumption. In regard to this last characteristic, "fan-out" or the ability of a primary logic element to operate a given number of subsequent logic elements with its output is greatly improved, since the no-or very low-flow operation insures good pressure recovery therethrough.

Typical of these elements are moving spool, free disc, poppet valve, and diaphragm valve type devices. In connection with the diaphragm valve type device, a control pressure is normally utilized to control the movement of a diaphragm against the action of a supply pressure to in turn control communication of the supply pressure with an output as described in U.S. Pat. Nos. 3,312,238; 3,312,244; 3,318,329; 3,433,257; and 3,463,442. In order to maximize "fan-out" the control pressure at which the diaphragm is moved against the supply pressure should be a lesser value than the supply pressure to insure maximum available system pressure at the output.

To provide this feature, prior art diaphragm valves have used restrictions in the supply line upstream of a diaphragm valve, compound diaphragms to provide a differential area, or partitioning of supply pressure side of the diaphragm valve chamber combined with restrictions to in effect create an area differential, some of these approaches being illustrated in the above-mentioned patents.

These approaches, while generally satisfactory, in some cases affect the pressure recovery characteristics thereof and usually tend to complicate the structure and the design of these elements.

Therefore, it is an object of the present invention to provide a diaphragm valve logic element which is capable of operation by a control pressure lower than the supply pressure with a minimum effect on the pressure recovery characteristics by means of an extremely simple arrangement.

SUMMARY OF THE INVENTION

This object and others which will become apparent upon a reading of the following specification and claims is accomplished by providing an arrangement whereby the supply fluid is caused to flow through a reduced section defined in part by the diaphragm element of such configuration that the average pressure acting on the supply side of the diaphragm is reduced by the Bernoulli effect to a value sustantially less than the supply or output fluid pressure.

DESCRIPTION OF THE DRAWINGS

FIG. 3 is a schematic representation of the connections and elements required to obtain the logic NOR function with diaphragm valves according to the present invention.

FIG. 3a is a logic table listing the inputs and outputs obtained from the arrangement shown by the schematic representation in FIG. 3.

FIG. 4 is a schematic representation of the connections and elements required to obtain the logic AND function with the diaphragm valves according to the present invention.

FIG. 4a is a logic table listing the input and outputs obtained from the arrangement shown by the schematic representation of FIG. 4.

FIG. 5 is a schematic representation of the connections and elements required to obtain the logic OR function with the diaphragm valves according to the present invention.

FIG. 5a is a logic table listing the input and outputs obtained from the arrangement shown by the schematic representation in FIG. 5.

FIG. 6 is a schematic representation of the connections and elements required to obtain the logic NAND function with diaphragm valves according to the present invention.

FIG. 6a is a logic table listing the input and output obtained from the arrangement shown by the schematic representation in FIG. 6.

DETAILED DESCRIPTION

In the following detailed description, certain specific terminology will be utilized for the sake of clarity and specific embodiments will be described in order to provide a complete understanding of the invention, but it is to be understood that the invention is not so limited and may be practiced in a variety of forms and embodiments.

Figure 1:
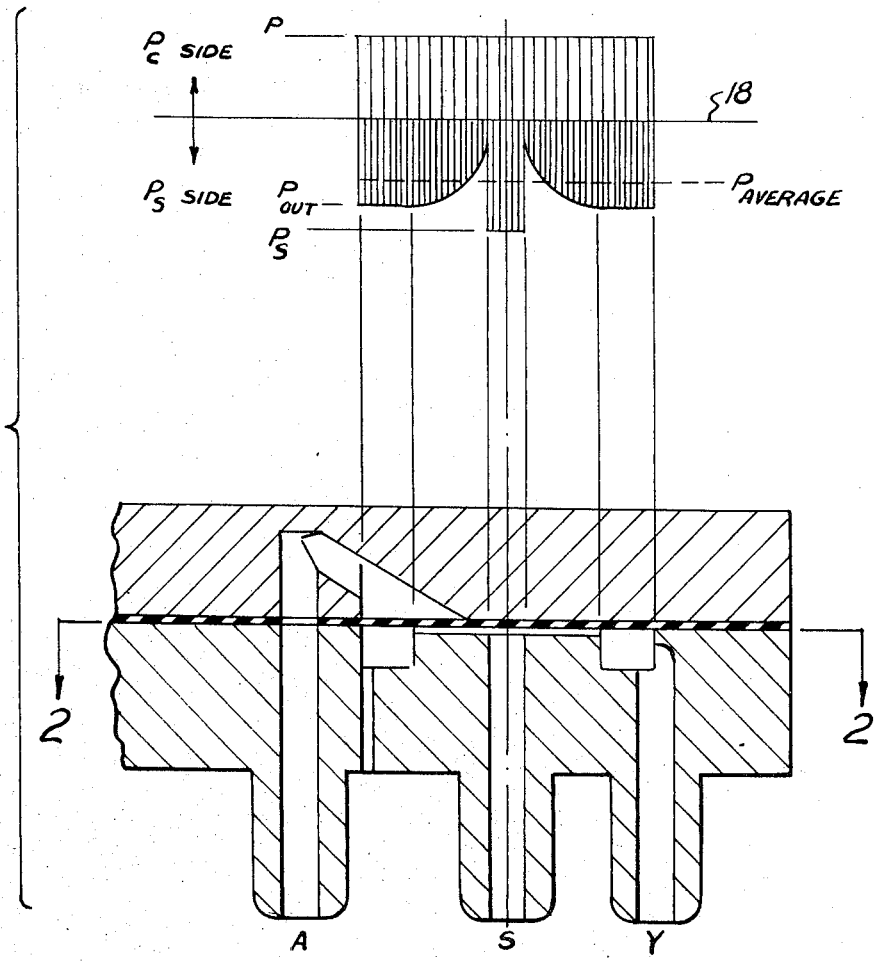
FIG. 1 is a sectional view of a diaphragm valve according to the present invention, together with a graphical plot of the pressure distribution existing across the valve diaphragm.
Figure 2:
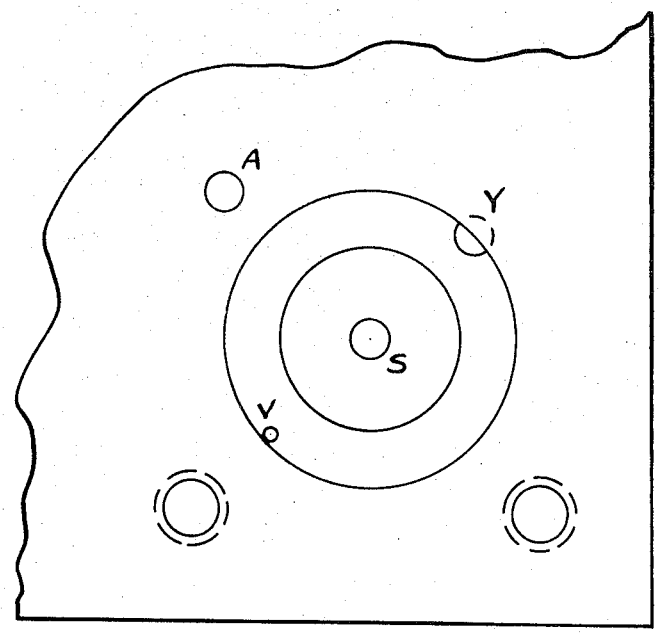
FIG. 2 is a view of the section taken along the line 2—2 in FIG. 1.

Referring to the drawings, and particularly FIGS. 1 and 2, the diaphragm valve 10 is depicted which includes a housing 12 comprised of cover plate 14 and a ventury plate 16 fastened together with a diaphragm 18 sandwiched therebetween.

A control pressure source 20 providing fluid under control pressure is included which is communicated via passages 22 and 24 to the region above the diaphragm 18 which, together with the cover plate 14, defines a control pressure chamber 26. A supply pressure source 28 providing fluid under supply pressure is also included which is communicated via passage 30 to the region below the diaphragm 18 which, together with the venturi plate 16, defines a supply pressure chamber 32.

The passage 30 exits into chamber 32 via a raised boss 34 which, together with diaphragm 18 backed up by a surface 36 of the cover plate 14, defines a flow passage 38 of reduced sectional area opening into an annular groove 40.

Communicating with the groove 40 is a vent passage 42 which is vented to the atmosphere or a low pressure region.

Also communicating with the groove 40 is the output passage 44, which leads to a utilization device 46, such as another logic element or control actuator.

In operation, in the absence of a control signal from the control pressure source 20 the diaphragm 18 is in the position shown and fluid from the supply pressure source 28 flows through passage 30, reduced cross-sectional flow passage 38, and into groove 40 to pressurize the outlet passage 44 and utilization device 46. If the utilization device 46 is no-flow or a blocked load as typically it would be, the fluid flows out the vent passage only and the flow rate for a given supply pressure is controlled by the pressure drop thereacross, as well as across the reduced cross-sectional flow passage 38.

Referring to the pressure diaphragm of FIG. 1, the lines below the schematic representation of the diaphragm 18 indicate the static pressure distribution against the diaphragm in the supply pressure chamber 32 as a result of the flow of fluid from the supply pressure source 28.

In the area "A" corresponding to the region opposite the passage 30, the pressure is at the level of the supply pressure $P_s$, while after passing into the much reduced cross-sectional area passage the static pressure reduces sharply as indicated in region "B". This is a result of the increased velocity of the fluid through the beginning portions of the flow passage 38 due to the Bernoulli effect in similar fashion to a venturi section in a round pipe. As the effective cross-sectional area of the flow passage 38 increases at points radially outward from the passage 30, the static pressure increases due to a decrease in velocity of the fluid flow as indicated in the outer portions of regions "B".

In the region opposite the groove 40 the pressure increases to a constant pressure $P_{out}$ which corresponds to the supply pressure $P_s$ minus the losses resulting from the fluid flow.

The average pressure $P_{av}$ across the diaphragm 18 on the supply pressure side is thus less than either the supply pressure $P_s$ or the output pressure $P_{out}$ and a control pressure $P_c$ equal to the $P_{av}$ pressure applied via passages 22 and 24 uniformly across the control pressure chamber side of the diaphragm 18 can cause movement thereof to seat on the boss 34 to seal off the passage 30 from the annular groove 40 and consequently the output passage 44 and utilization device 46.

Once the diaphragm 18 begins to move, the flow passage 38 is narrowed to further reduce the groove and average pressure, thus causing a quick "snap action" once switching is initiated.

It can be appreciated that, since the average pressure $P_{av}$ is less than that at the outlet $P_{out}$, the achievement of a switching pressure lowered below that of the supply pressure $P_s$ is attained without a complete loss of the pressure difference at the outlet 44 as is the case with a simple restriction used to drop the supply pressure, thereby improving the pressure recovery characteristics of the device and its fan-out capability.

The cross-sectional area variation of the flow passage 38 as the fluid passes radially outwardly, approaches that of a venturi exit section so that the losses resulting from turbulent flow therethrough are minimized to thus improve the pressure recovery characteristics thereof.

The vent passage 42 as noted above is provided and sized to produce the flow necessary to achieve the designed for $P_{average}$, but if the utilization device 46 is not a blocked load and flow will occur, the vent could be blocked as the flow to the utilization device 46 will produce the necessary pressure drop.

Referring to FIGS. 3–6a, the combination of elements and connections required to produce various logic functions is illustrated schematically together with the logic tables.

The symbol key for these schematics is as follow:

$\Delta$ = Supply port
$\cancel{\:}$ = Orifice
$\sqcap$ = Blocked passage
$v$ = Vent to ambient
A, B = Input signals
Y = Output signal FIG. 3 illustrates a NOR gate combination, A is an input to the control inlet of a first diaphragm valve 48, B is the input to the control inlet of a second diaphragm valve 50, while the output Y is the outlet of diaphragm valve 50 while the outlet of diaphragm valve 48 is connected to the supply of the diaphragm 50. The vent passage of the diaphragm valve 48 may be blocked as shown, since flow to either the utilization device connected to Y or the vent passage of diaphragm valve 50 via the interconnection will provide the necessary Bernoulli pressure drop. This combination and and connection will produce the gating tabulated in FIG. 3a.

FIG. 4 shows an AND gate combination in which the control inlet of a first diaphragm valve 52 is the A input, the supply inlet of a second diaphragm valve 54 is the B input, the output of the second diaphragm valve 54 is output Y, and output of diaphragm valve 52 is connected to the control inlet of diaphragm valve 54. This gives the AND gate logic combinations tabulated in FIG. 4a.

FIG. 5 shows an OR gate combination in which a pair of diaphragm valves 56 and 58 are interconnected with each other and with the A and B inputs as in the NOR gate combination of FIG. 3, but the outlet of diaphragm valve 58 is connected to the control inlet of a third diaphragm valve 60 and the output Y is taken from its outlet. The OR gate logic is then as tabulated in FIG. 5a.

FIG. 6 shows the NAND gate combination which is a combination of diaphragm valve 62 and 64 the same as the AND gate of FIG. 4 except the outlet of diaphragm valve is connected to the inlet of a third diaphragm valve 66 and the output Y is taken at the outlet 66 to produce the NAND gating tabulated in FIG. 6a.

Thus it can be appreciated that, by providing a "venturi" section defined in part by the diaphragm element, a diaphragm valve of very simple construction has been provided which is capable of being switched by a control pressure without unduly decreasing the pressure recovery characteristics of the device.

Many variations are of course possible within the scope of the invention.

Therefore, what is claimed is:

1. A diaphragm valve comprising:
a housing;
a diaphragm disposed in said housing to define a pair of chambers on either side of said diaphragm;
means for directing a control fluid under pressure into one of said chambers;
an outlet;
means causing said diaphragm to assume a first position in which said inlet means and said outlet are in communication in response to a greater fluid pressure acting on the other chamber side than the one chamber side of said diaphragm and causing said diaphragm to move to a second position in which said inlet means and outlet are not in communication whenever a lesser fluid pressure is acting on said chamber other side than said one chamber side of said diaphragm;
flow passage means providing said communication between said inlet means and said outlet in said first diaphragm position defined in part by said diaphragm and including a region of reduced cross-sectional area relative said inlet means, said reduced cross-sectional area region producing a substantially reduced static pressure acting on said diaphragm sufficient during fluid flow through said flow passage means to create an average pressure acting on said diaphragm less than the pressures in said other chamber at said inlet and outlet, whereby a control pressure of lesser magnitude than said supply pressure can cause said diaphragm to assume said second position without excessive pressure losses at said outlet.

2. The valve of claim 1 further including means for creating supply pressure flow when said outlet is blocked including a vent passage communicating with said other chamber.

3. The valve of claim 1 wherein said region of reduced cross-sectional area flow passage gradually increases in cross-sectional area downstream of the direction of flow therethrough, whereby flow losses are minimized.

4. The valve of claim 3 wherein said flow passage means further includes a raised boss having a central supply passage therein and disposed normal and adjacent to said diaphragm to define said flow passage therebetween.

5. The valve of claim 1 wherein said diaphragm is positively restrained from moving past a predetermined point toward said other chamber side in the vicinity of said reduced cross-sectional area flow passage, whereby said reduced cross-sectional area is maintained aginst fluid pressures exerted by said supply fluid.

* * * * *